(12) United States Patent
Akiyoshi et al.

(10) Patent No.: US 9,702,418 B2
(45) Date of Patent: Jul. 11, 2017

(54) ROTATION TRANSMISSION DEVICE

(71) Applicants: Koji Akiyoshi, Shizuoka (JP); Koji Sato, Shizuoka (JP); Naotsugu Kitayama, Shizuoka (JP); Takahide Saito, Shizuoka (JP)

(72) Inventors: Koji Akiyoshi, Shizuoka (JP); Koji Sato, Shizuoka (JP); Naotsugu Kitayama, Shizuoka (JP); Takahide Saito, Shizuoka (JP)

(73) Assignee: NTN CORPORATION, Osaka (JP)

( * ) Notice: Subject to any disclaimer, the term of this patent is extended or adjusted under 35 U.S.C. 154(b) by 61 days.

(21) Appl. No.: 14/385,791

(22) PCT Filed: Mar. 29, 2013

(86) PCT No.: PCT/JP2013/059625
§ 371 (c)(1),
(2) Date: Sep. 17, 2014

(87) PCT Pub. No.: WO2013/150982
PCT Pub. Date: Oct. 10, 2013

(65) Prior Publication Data
US 2015/0075936 A1    Mar. 19, 2015

(30) Foreign Application Priority Data

Apr. 2, 2012  (JP) ................................. 2012-083703
Jul. 12, 2012  (JP) ................................. 2012-156439
(Continued)

(51) Int. Cl.
*F16D 41/08*     (2006.01)
*F16D 41/10*     (2006.01)
(Continued)

(52) U.S. Cl.
CPC .......... *F16D 41/088* (2013.01); *F16D 27/118* (2013.01); *F16D 41/08* (2013.01); *F16D 41/105* (2013.01); *F16D 2023/123* (2013.01)

(58) Field of Classification Search
CPC .. F16D 41/118; F16D 2023/123; F16D 41/08; F16D 41/105; F16D 41/088;
(Continued)

(56) References Cited

U.S. PATENT DOCUMENTS 3,414,100 A  * 12/1968 Spencer ................ F16D 27/112
                                                          192/69.82
2002/0134634 A1 * 9/2002 Ito .......................... B60K 6/387
                                                          192/35

(Continued)

FOREIGN PATENT DOCUMENTS

| JP | 2004-332825 | 11/2004 |
| JP | 2007-064465 | 3/2007 |

(Continued)

OTHER PUBLICATIONS

Machine translation of JP 2008-051244, Oct. 7, 2015.*
(Continued)

*Primary Examiner* — Stacey Fluhart
(74) *Attorney, Agent, or Firm* — Wenderoth, Lind & Ponack, L.L.P.

(57) ABSTRACT

A rotation transmission device includes a two-way clutch which is selectively engaged and disengaged by an electromagnetic clutch. The two-way clutch includes a control retainer and a rotary retainer. The control retainer and the rotary retainer have flanges and bars formed on outer peripheral portions of the respective flanges and arranged so as to circumferentially alternate with each other with pockets defined between adjacent bars. Two rollers are received in each pocket. When the control retainer and the rotary
(Continued)

retainer are rotated relative to each other, the rollers are adapted to be pushed by the bars to the disengaged position. An anti-rotation arrangement is provided on opposed surfaces of an outer ring and the control retainer member. The anti-rotation arrangement is adapted to prevent the control retainer from rotating relative to the outer ring while the rollers are in engagement, thereby preventing the rollers from moving to the neutral position.

17 Claims, 12 Drawing Sheets

(30) Foreign Application Priority Data

Jul. 24, 2012 (JP) ................................ 2012-163667
Jan. 17, 2013 (JP) ................................ 2013-005997

(51) Int. Cl.
*F16D 27/118* (2006.01)
*F16D 23/12* (2006.01)

(58) Field of Classification Search
CPC ...... F16D 27/118; F16D 15/00; F16D 27/102; F16D 28/00; F16D 2011/008
USPC .............................................. 192/69.82, 108
See application file for complete search history.

(56) References Cited

U.S. PATENT DOCUMENTS

| | | | |
|---|---|---|---|
| 2010/0314212 A1* | 12/2010 | Akiyoshi | .............. F16D 41/105 192/66.1 |
| 2011/0061983 A1 | 3/2011 | Sato et al. | |

FOREIGN PATENT DOCUMENTS

| | | |
|---|---|---|
| JP | 2008-051244 | 3/2008 |
| JP | 2008-298105 | 12/2008 |
| JP | 2009-293679 | 12/2009 |
| JP | 2010-065813 | 3/2010 |

OTHER PUBLICATIONS

International Search Report issued Jul. 2, 2013 in International (PCT) Application No. PCT/JP2013/059625.
Written Opinion of the International Searching Authority issued Jul. 2, 2013 in International (PCT) Application No. PCT/JP2013/059625 (with English translation).

* cited by examiner (a)

(b)

(a)

(b)

ROTATION TRANSMISSION DEVICE

TECHNICAL FIELD

This invention relates to a rotation transmission device which can selectively transmit rotation of one member to another member.

BACKGROUND ART

One known rotation transmission device which can selectively transmit rotation of a driving shaft to a driven shaft includes a two-way clutch and an electromagnetic clutch for selectively engaging and disengaging the two-way clutch.

The rotation transmission device disclosed in the below-identified Patent document 1 includes an outer ring, an inner ring mounted inside the outer ring, and a control retainer and a rotary retainer each having bars and mounted between the inner and outer rings such that the bars of the control retainer are arranged circumferentially alternating with the bars of the rotary retainer, whereby pockets are defined between circumferentially adjacent pairs of the bars of the respective retainers. The rotation transmission device further includes opposed pairs of rollers, each pair being mounted in one of the pockets, and elastic members each mounted in one of the pockets and biasing the opposed pair of rollers in the one of the pockets away from each other to a stand-by position where the rollers can instantly engage a cylindrical surface formed on the inner periphery of the outer ring and one of cam surfaces formed on the outer periphery of the inner ring such that when the inner ring rotates in either direction, one of each pair of rollers engages the cylindrical surface and the cam surface, thereby transmitting rotation of the inner ring to the outer ring.

The rotation transmission device further includes an electromagnetic clutch mounted on an input shaft, which carries the inner ring. The electromagnetic clutch is configured to move the control retainer in the axial direction when the electromagnetic coil of the electromagnetic clutch is energized. When the control retainer is moved in the axial direction by the electromagnetic clutch, the retainers are rotated relative to each other in the direction in which the circumferential widths of the pockets decrease due to the action of a torque cam provided between the opposed surfaces of a flange of the control retainer and a flange of the rotary retainer, whereby the pairs of rollers are moved by the bars of the respective retainers to the disengaged position, thus preventing transmission of rotation from the inner ring to the outer ring.

In this rotation transmission device, when the electromagnetic coil of the electromagnetic clutch is de-energized, the control retainer and the rotary retainer are rotated relative to each other in the direction in which the circumferential widths of the pockets increase under the biasing force of the elastic members mounted between the respective opposed pairs of rollers. Thus the rollers can instantly engage the cylindrical surface and the cam surfaces, so that the rollers scarcely move in the circumferential direction when engaging the cylindrical surface and the cam surfaces. The response time is thus short.

PRIOR ART DOCUMENT(S)

Patent Document(s)

Patent document 1: Japanese Patent Publication 2009-293679A

In the rotation transmission device disclosed in Patent document 1, with the electromagnetic coil of the electromagnetic clutch de-energized such that the pairs of rollers are brought into the stand-by position where the rollers are in abutment with the cylindrical surface and the cam surfaces. When the outer ring and the inner ring rotate relative to each other, the rollers engage the cylindrical surface and the cam surfaces. Either in the standby position or in the engaged position, the outer race and the inner race could rotate relative to each other due to inertia moment under the influence of disturbance applied to the rotation transmission device, such as vibration. If the outer race and the inner race should actually rotate relative to each other in the stand-by or engaged position, this could move one of each pair of rollers to the neutral position, making it impossible to transmit torque between the inner ring and the outer ring. It is therefore desired to further improve reliability of this rotation transmission device.

Since this rotation transmission device is configured such that the entire control retainer and the entire rotary retainer are received in the outer ring, the outer ring tends to be axially long and heavy. It is therefore desired to reduce the weight of the outer ring.

SUMMARY OF THE INVENTION

An object of the present invention is to prevent the rollers from moving to the neutral position under the influence of disturbance while the two-way clutch is engaged, thereby improving reliability of the rotation transmission device.

Means for Achieving the Object

In order to achieve this object, the present invention provides a rotation transmission device comprising an input shaft, an output shaft arranged coaxial with the input shaft, a two-way clutch configured to selectively transmit torque between the input shaft and the output shaft, and an electromagnetic clutch configured to selectively engage and disengage the two-way clutch. The two-way clutch comprises an outer ring provided at an end of the output shaft, an inner ring provided at an end of the input shaft, a control retainer and a rotary retainer which both have bars disposed between the inner periphery of the outer ring and the outer periphery of the inner ring and arranged such that the bars of the control retainer circumferentially alternate with the respective bars of the rotary retainer, with pockets defined between adjacent bars of the control retainer and the rotary retainer, a plurality of pairs of engaging elements, each pair of the engaging elements being mounted in one of the pockets so as to be engageable with the inner periphery of the outer ring and the outer periphery of the inner ring, and elastic members mounted in the respective pockets and biasing the respective pairs of engaging elements away from each other. The electromagnetic clutch comprises an armature coupled to the control retainer, a rotor axially facing the armature, and an electromagnet axially facing the rotor and configured to attract the armature against the rotor, thereby axially moving the control retainer toward the rotor, upon energization of the electromagnet. The two-way clutch further comprises a motion converter mechanism configured to convert the axial movement of the control retainer toward the rotor to relative rotation between the control retainer and the rotary retainer in the direction in which the circumferential widths of the pockets decrease, and disengage the engaging elements. The rotation transmission device further comprises an anti-rotation arrangement disposed between the outer ring and the control retainer and configured to prevent relative rotation between the outer ring and the control retainer while the electromagnet is de-energized and the two-way clutch is engaged.

With the electromagnetic coil of the electromagnetic clutch disengaged and thus the flange of the control retainer in contact with the open end surface of the outer ring, the anti-rotation arrangement prevents relative rotation between the outer ring and the control retainer. In particular, the anti-rotation arrangement prevents rotation of the control retainer relative to the outer ring under the influence of disturbance while the rollers are in the stand-by position in which the rollers are in contact with the cylindrical surface and the cam surfaces, or in the engaged position.

This prevents the engaged rollers from moving to the neutral position, which makes it possible to reliably transmit torque between the inner ring and the outer ring through the engaged rollers, thus improving reliability of the rotation transmission device.

The anti-rotation arrangement used in the rotation transmission device according to the present invention may be of any of the below structures:

Structure a) comprising protrusions formed on one of the open end surface of the outer ring and the opposed surface of the flange of the control retainer facing the open end surface of the outer ring, and recesses formed in the other of the open end surface and the opposed surface. Each of the recesses has two circumferentially opposed end surfaces, and the protrusions and the recesses are configured such that when the protrusions are received in at least one of the recesses, at least two of the protrusions can engage two of the end surfaces of the recesses, thereby preventing relative rotation between the outer ring and the control retainer.

Structure b) comprising a pin provided on one of the open end surface of the outer ring and the opposed surface of the flange of the control retainer facing the open end surface, and a pin hole formed in the other of the open end surface and the opposed surface. The pin and the pin hole are arranged such that the pin is engageable in the pin hole, thereby preventing rotation of the control retainer relative to the outer ring.

Structure c) comprising friction members fixed to the open end surface of the outer ring and the surface of the flange of the control retainer facing the open end surface, respectively The friction members are configured to be brought into frictional contact with each other, thereby preventing rotation of the control retainer relative to the outer ring.

Structure d) comprising rough surfaces formed on the open end surface of the outer ring and the surface of the flange of the control retainer facing the open end surface, respectively. The rough surfaces are configured to be brought into surface contact with each other, thereby preventing rotation of the control retainer relative to the outer ring.

If Structure a) is used as the anti-rotation arrangement, the protrusions and the recesses are sized such that the protrusions can be loosely fitted in the respective recesses in the circumferential direction. In particular, the protrusions are relatively small protrusions, and the recesses are circumferentially elongated, circular arc-shaped recesses, wherein the recesses are larger in number than the number of the protrusions.

If Structure b) is used as the anti-rotation means, at least one additional pin and at least one additional pin hole may be provided such that the pins are equal in number to the number of the pin holes, or the number of the pin holes is an integer multiple of the number of the pins.

In the rotation transmission device according to the present invention, the motion converter mechanism for converting the axial movement of the control retainer to relative rotation between the control retainer and the rotary retainer may be in the form of a torque cam including opposed pairs of cam grooves formed in the respective opposed surfaces of the flange of the control retainer and the flange of the rotary retainer. Each of the cam grooves is the deepest at the circumferential center of the cam groove, and the depth of the cam groove gradually decreases toward the respective circumferential ends of the cam groove. Balls are mounted between the respective opposed pairs of cam grooves, whereby the torque cam is configured to rotate the control retainer and the rotary retainer relative to each other in the direction in which the circumferential widths of the pockets decrease when the control retainer is moved in the axial direction.

If this torque cam is used together with Structure a) as the anti-rotation arrangement, when the electromagnet is energized while torque is being transmitted through the engaging elements that are in contact with the bars of the rotary retainer, since the rotary retainer is in engagement with the engaging elements through which torque is being transmitted, and thus cannot rotate in the direction in which the circumferential widths of the pockets decrease, the control retainer tends to rotate in the direction in which the circumferential widths of the pockets decrease, while simultaneously moving toward the rotor, by the action of the torque cam.

However, if the inclination angles of the end surfaces of the protrusions and the recesses that are in engagement with each other are larger than the inclination angles of the cam grooves of the torque cam, the end surfaces that are in engagement with each other could interfere with the rotation of the control retainer member, thereby making it impossible for the engaging elements to disengage.

According to the present invention, each of the protrusions of the anti-rotation arrangement has leading and trailing end surfaces with respect to the normal rotational direction of the outer ring, the trailing end surfaces and one of the two end surfaces of each of the recesses that can face the trailing end surfaces are tapered surfaces, and the inclination angles of the respective tapered surfaces with respect to the open end surface of the outer ring are smaller than inclination angles of the respective cam grooves with respect to the open end surface of the outer ring. With this arrangement, the anti-rotation arrangement will never interfere with the rotation of the control retainer in the direction in which the circumferential widths of the pockets decrease while the electromagnet is energized, thus allowing reliable disengagement of the two-way clutch.

As used herein, the "normal rotational direction" refers to the clockwise rotational direction of the outer ring when the open end surface of the outer ring is viewed from the direction normal to the open end surface.

If this torque cam is used, only the surfaces of cam grooves of the control retainer and the rotary retainer are subjected to local heat treatment to form hardened surface layers on the respective cam grooves that are harder than the inner portions, without affecting, namely without reducing the toughness of, the roots of the retainers. Such heat treatment therefore prevents wear and deformation of the surface layers of the cam grooves as well as damage to the roots of the bars of the retainer, thus improving durability of the retainers.

Preferably, the depths of the hardened surface layers are within a range of 0.3 to 0.8 mm in order to effectively avoid the influence of heat treatment on the roots of the bars of the retainers.

Such heat treatment may be induction hardening or laser hardening.

In the rotation transmission device according to the present invention, the control retainer may be formed with a weight reducing hole or recess in at least one of the radially outer surface and a side surface of the control retainer to reduce the weight of the control retainer, and thus to reduce the capacity and size of the electromagnetic clutch.

By arranging the control retainer and the rotary retainer such that only the bars of the control retainer and the rotary retainer are disposed between the inner ring and the outer ring, it is possible to reduce the axial length of the outer ring compared to the arrangement in which the control retainer and the rotary retainer are entirely disposed between the inner ring and the outer ring.

The rotation transmission device may further comprise a housing covering the two-way clutch and the electromagnetic clutch, and including a bearing tube through which the output shaft is inserted, and a seal press-fitted in the radially inner surface of the bearing tube and sealing between the radially inner surface of the bearing tube and the radially outer surface of the output shaft. With this arrangement, it is possible to prevent entry of foreign matter into the housing through the opening of the bearing, which in turn prevents the two-way clutch from becoming clogged with foreign matter and inoperative.

Advantages of the Invention

According to the present invention, with the electromagnetic coil of the electromagnetic clutch disengaged and thus the flange of the control retainer in contact with the open end surface of the outer ring, the anti-rotation arrangement prevents relative rotation between the outer ring and the control retainer. In particular, the anti-rotation arrangement prevents rotation of the control retainer relative to the outer ring while the rollers are in the stand-by position in which the rollers are in contact with the cylindrical surface and the cam surfaces, or in the engaged position, until the rollers are moved to neutral position where the rollers are disengaged. This makes it possible to reliably transmit torque between the inner ring and the outer ring through the engaged rollers, which in turn improves reliability of the rotation transmission device.

DETAILED DESCRIPTION OF THE INVENTION

Figure 1:
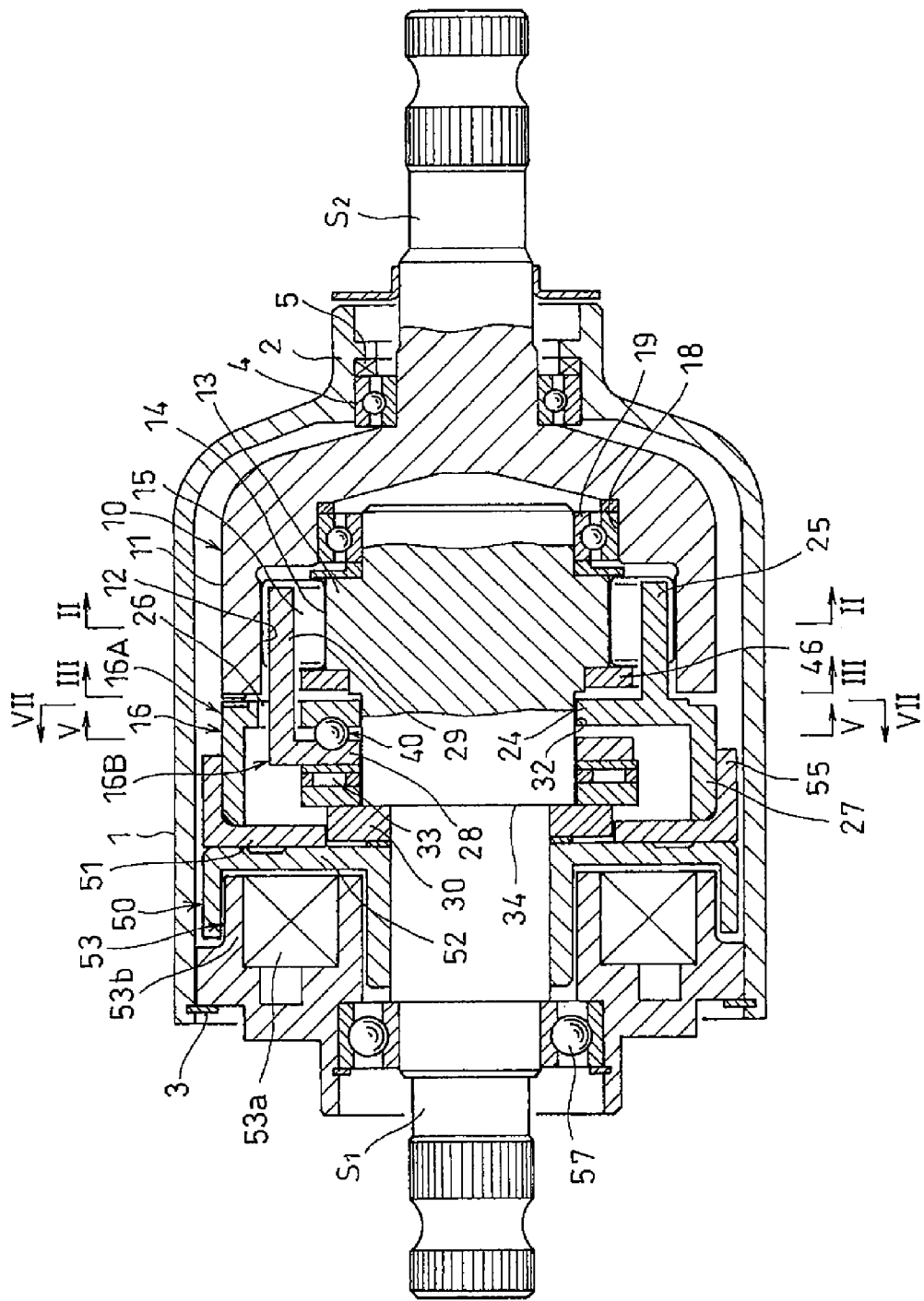
FIG. 1 is a vertical sectional view of a rotation transmission device embodying the present invention.

Now the embodiment of the present invention is described with reference to the drawings. FIG. 1 shows a rotation transmission device embodying the present invention. As shown, the rotation transmission device includes an input shaft $S_1$, an output shaft $S_2$ arranged coaxially with the input shaft $S_1$, a housing 1 covering the opposed end portions of the shafts $S_1$ and $S_2$, a two-way clutch 10 mounted in the housing 1 and configured to selectively transmit the rotation of the input shaft $S_1$ to the output shaft $S_2$, and an electromagnetic clutch 50 for selectively engaging and disengaging the two-way clutch 10.

The housing 1 is a cylindrical member formed with a small-diameter bearing tube 2 at a first end thereof. A snap ring 3 is mounted on the inner periphery of the housing 1 at the second end of the housing 3 opposite from the first end, preventing separation of the electromagnetic clutch 50.

Figure 2:
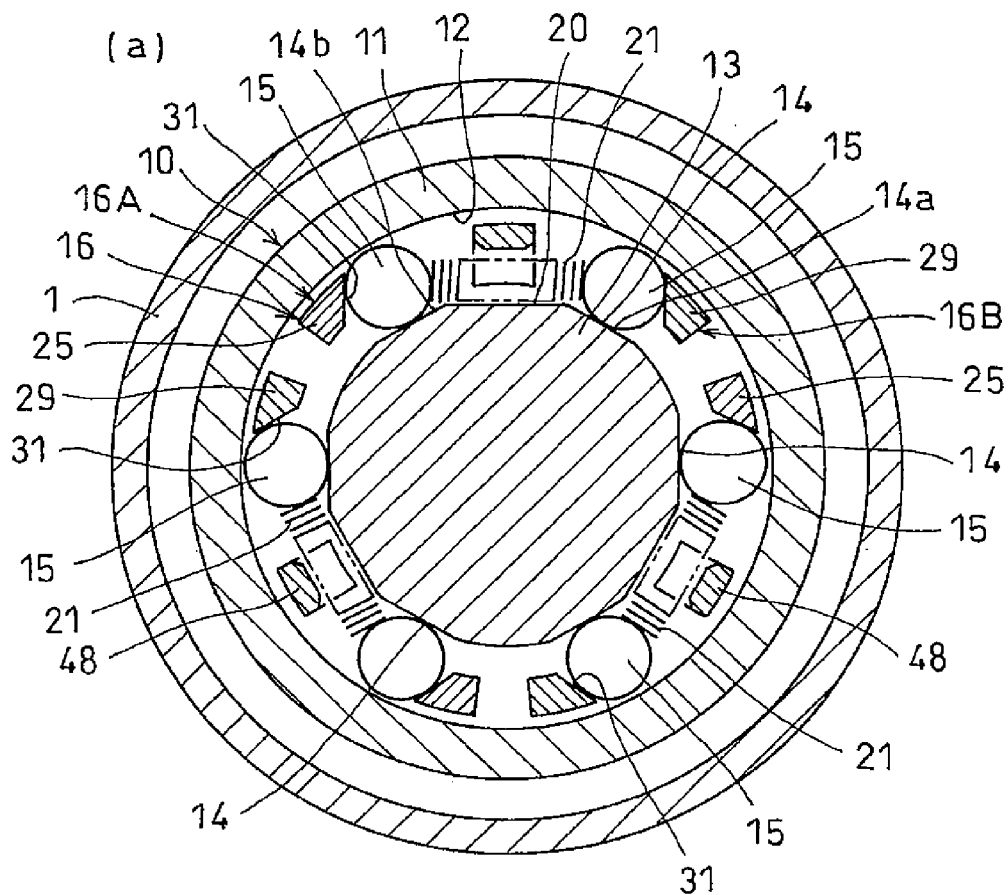
FIG. 2(a) is a sectional view taken along line II-II of FIG. 1.
FIG. 2(b) is a sectional view showing the state in which rollers are engaged.
Figure 2:
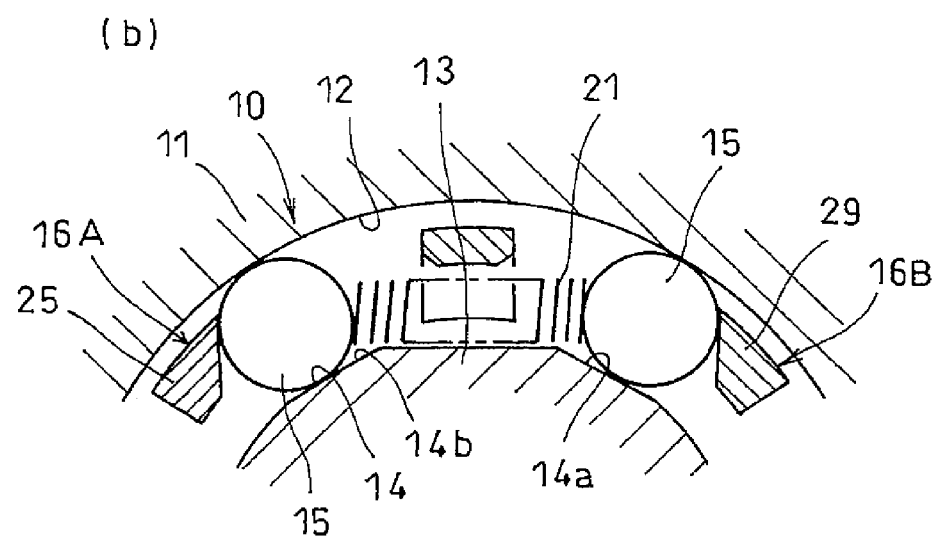

As shown in FIGS. 1 and 2, the two-way clutch 10 includes an outer ring 11 provided at the end of the output shaft $S_2$ and formed with a cylindrical surface 12 on the inner periphery of the outer ring 11, and an inner ring 13 provided at the end of the input shaft $S_1$ and formed with a plurality of circumferentially arranged cam surfaces 14 on the outer periphery of the inner ring 13. A pair of rollers 15 as engaging elements and an elastic member 21 are disposed between each cam surface 14 and the cylindrical surface 12. The two-way clutch 10 further includes a retainer 16 retaining the rollers 15 such that when the inner ring 13 rotates in one direction, one of each pair of rollers 15 engages the cylindrical surface 12 and the cam surface 14, thereby transmitting the rotation of the inner ring 13 to the outer ring 11. When the outer ring 11 rotates in the other direction, the other of each pair of rollers 15 engages the cylindrical surface 12 and the cam surface 14, thereby transmitting the rotation of the inner ring 13 to the outer ring 11.

A small-diameter recess 18 is formed in the inner surface of the closed end of the outer ring 11. The input shaft S1 has its end rotatably supported by a bearing 19 mounted in the recess 18.

The inner ring 13 is integral with the input shaft S1. As shown in FIG. 2, the cam surfaces 14, which are formed on the outer periphery of the inner ring 13, each comprise a pair of ramps 14a and 14b which are inclined in opposite directions to each other, and each defines a wedge-shaped space narrowing toward the circumferential ends thereof in cooperation with the cylindrical surface 12. Flat spring support surfaces 20 extend in the tangential directions of the inner ring 13 between the respective pairs of ramps 14a and 14b to support the respective elastic members 21.

The elastic members 21 are coil springs, and are disposed between the respective pairs of rollers 15. The elastic members 21 thus bias the respective pairs of rollers 15 away from each other toward standby positions where the rollers 15 can instantly engage the cylindrical surface 12 and the cam surfaces 14.

Figure 5:
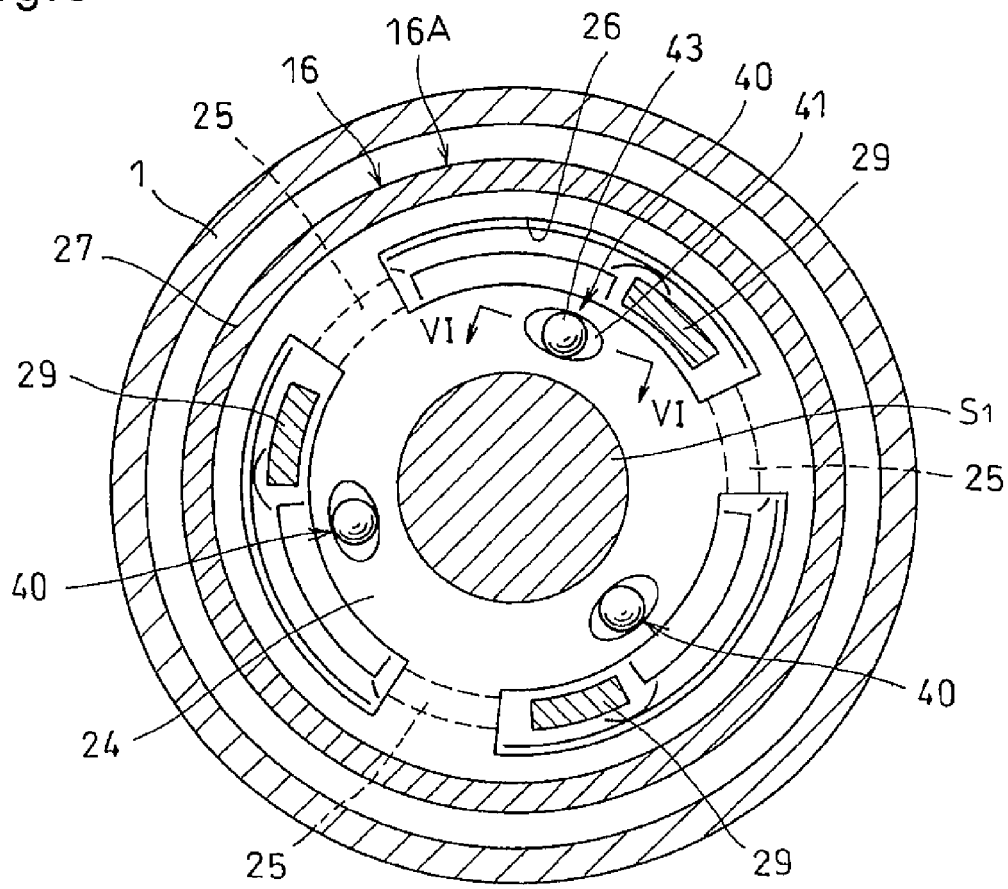
FIG. 5 is a sectional view taken along line V-V of FIG. 1.

The retainer 16 comprises a control retainer member 16A and a rotary retainer member 16B. As shown in FIGS. 1 and 5, the control retainer member 16A includes a first annular flange 24, and bars 25 equal in number to the number of the cam surfaces 14 and extending from the radially outer portion of one side of the first annular flange 24 while being circumferentially equidistantly spaced apart from each other. The first annular flange 24 is formed with circular arc-shaped elongated holes 26 between the respective adjacent pairs of bars 25. The control retainer member 16A further includes a tubular portion 27 extending from the radially outer edge of the first annular flange 24 in the opposite direction to the bars 25.

The rotary retainer member 16B includes a second annular flange 28, and bars 29 equal in number to the number of the cam surfaces 14 and extending from the radially outer portion of the second annular flange 28 while being circumferentially equidistantly spaced apart from each other.

The control retainer member 16A and the rotary retainer member 16B are combined together in such a way that the bars 29 of the rotary retainer member 16B are received in the respective elongated holes 26 of the control retainer member 16A such that the bars 25 and 29 are arranged circumferentially alternating with each other. In this combined state, the distal ends of the bars 25 and 29 are disposed between the outer ring 11 and the inner ring 13, while the flange 24 of the control retainer member 16A and the flange 28 of the rotary retainer member 16B are located between a support ring 30 fitted on the outer periphery of the input shaft $S_1$ and the outer ring 11.

With the retainer members 16A and 16B mounted in position in this manner, as shown in FIG. 2, pockets 31 are defined between the respective bars 25 of the control retainer member 16A and the corresponding bars 29 of the rotary retainer member 16B so as to radially face the respective cam surfaces 14 of the inner ring 13. A pair of the rollers 15 and one of the elastic members 21 are received in each pocket 31 with the rollers facing each other.

Figure 9:
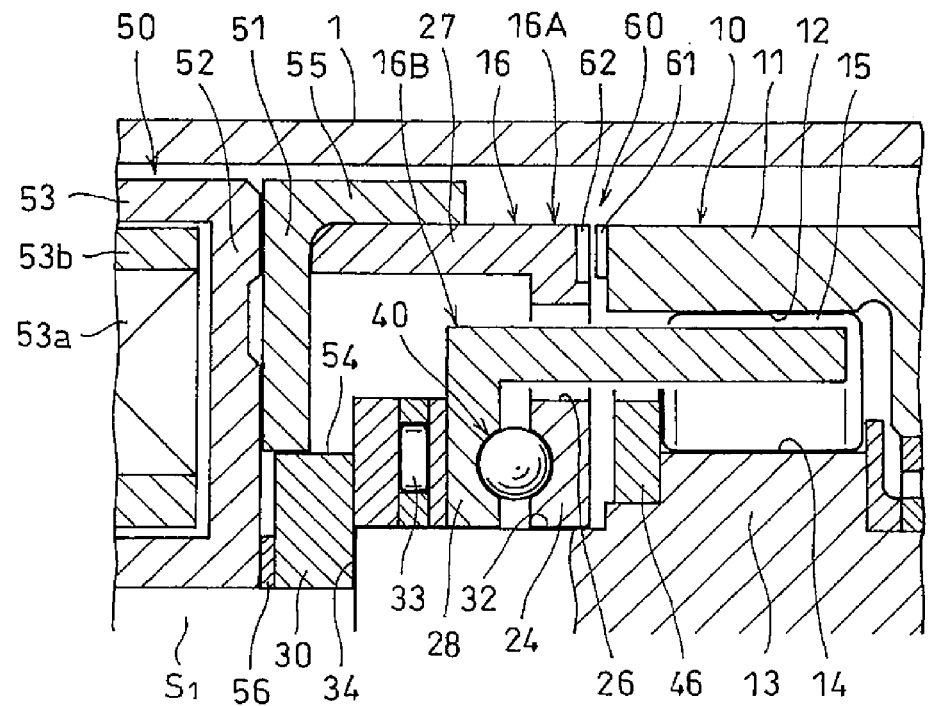
FIG. 9 is a sectional view showing how the control retainer member is attracted to an electromagnetic clutch shown in FIG. 1.

As shown in FIG. 9, the flange 24 of the control retainer member 16A and the flange 28 of the rotary retainer member 16B are supported by a slide guide surface 32 formed on the outer periphery of the input shaft $S_1$ so as to be slidable along the slide guide surface 32. A thrust bearing 33 is mounted between the flange 28 of the rotary retainer member 16B and the support ring 30 of the input shaft $S_1$.

Figure 6:
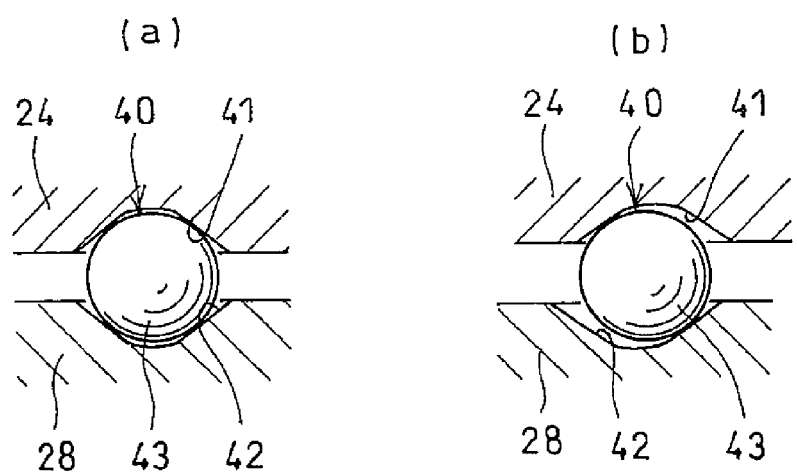
FIG. 6(a) is a sectional view taken along line VI-VI of FIG. 5.
FIG. 6(b) is a similar sectional view showing an operational state.

As shown in FIGS. 5, 6 and 9, a motion converter mechanism in the form of a torque cam 40 is provided between the flange 24 of the control retainer member 16A and the flange 28 of the rotary retainer member 16B. The torque cam 40 includes opposed pairs of cam grooves 41 and 42 formed in the respective opposed surfaces of the first flange 24 of the control retainer member 16A and the second flange 28 of the rotary retainer member 16B. The cam grooves 41 and 42 are each deepest at the circumferential center and its depth gradually decreases toward the respective circumferential ends. A ball 43 is mounted between one circumferential end of one of each opposed pair of cam grooves 41 and 42 and the opposite circumferential end of the other of the pair of cam grooves 41 and 42.

The cam grooves 41 and 42 shown are circular arc-shaped grooves. But V-shaped cam grooves may be used instead.

The torque cam 40 is configured such that when the control retainer member 16A is moved in the axial direction in which the first flange 24 of the control retainer member 16A approaches the second flange 28 of the rotary retainer member 16B, the balls 43 of the torque cam 40 roll toward the deepest points of the respective opposed pairs of cam grooves 41 and 42 (shown in FIG. 6(a)), thereby rotating the control retainer member 16A and the rotary retainer member 16B relative to each other in the direction in which the circumferential widths of the pockets 31 decrease.

Figure 3:
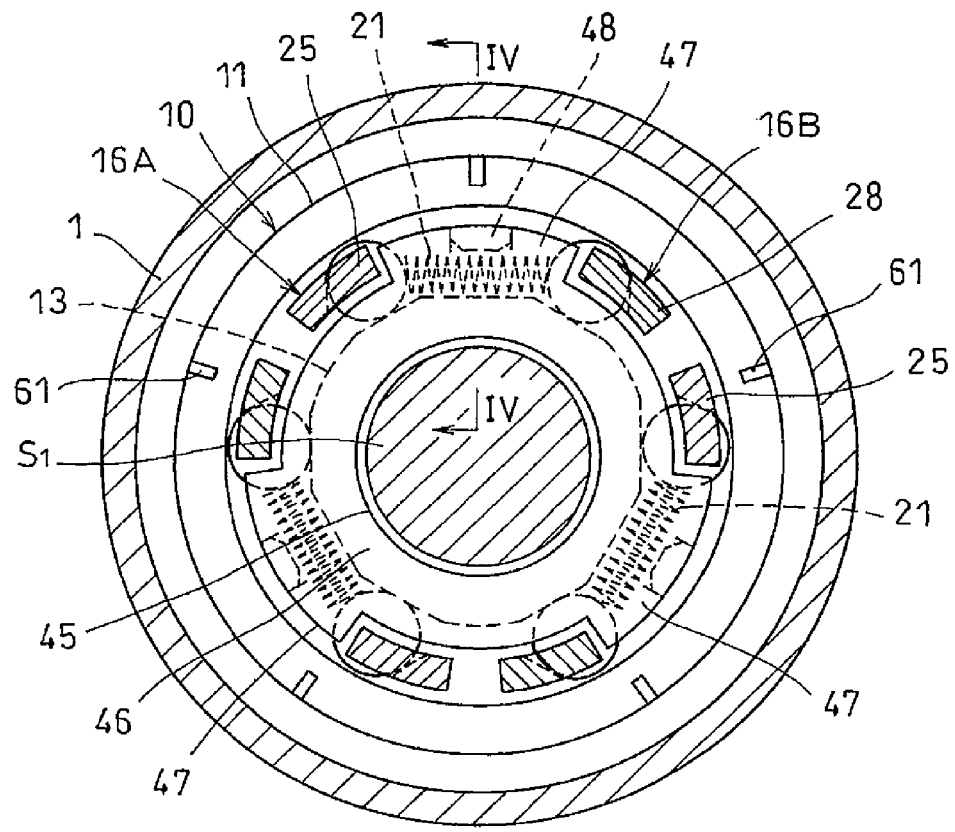
FIG. 3 is a sectional view taken along line III-III of FIG. 1.
Figure 4:
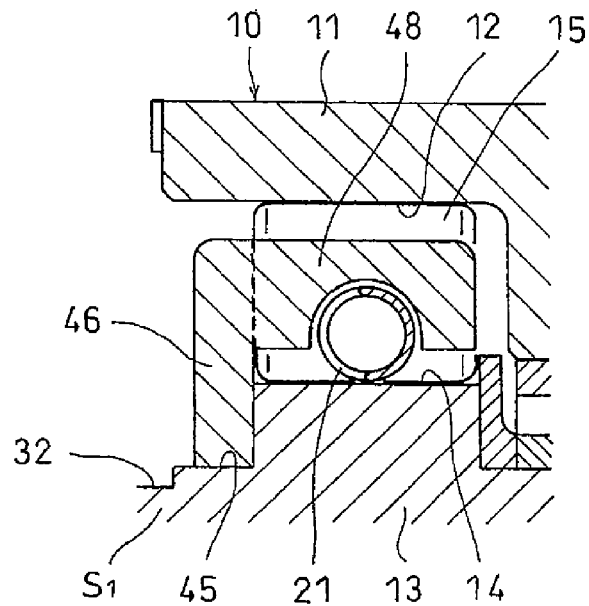
FIG. 4 is a sectional view taken along line IV-IV of FIG. 3.

As shown in FIGS. 3 and 4, a cylindrical surface 45 is formed on the second side of the inner ring 13 which is opposite from the first end of the housing. The diameter of the cylindrical surface 45 is larger than that of the slide guide surface 32. An annular retaining plate 46 is fitted on the cylindrical surface 45 so as to be fixed to the inner ring 13. The retaining plate 46 has at its outer peripheral portion a plurality of anti-rotation pieces 47 disposed in the respective pockets 31 defined between the bars 25 of the control retainer member 16A and the bars 29 of the rotary retainer member 16B.

The anti-rotation pieces 47 are arranged such that when the control retainer member 16A and the rotary retainer member 16B rotate relative to each other in the direction in which the circumferential widths of the pockets 31 decrease, the anti-rotation pieces 47 receive the bars 25 of the control retainer member 16A and the bars 29 of the rotary retainer member 16B on their side edges, thereby keeping the opposed pairs of rollers 15 at their neutral, disengaged position.

The retaining plate 46 further includes spring presser arms 48 provided at its outer peripheral portion so as to be disposed radially outwardly of the respective elastic members 21. The spring presser arms 48 thus prevent the elastic members 21 from being pushed radially outwardly out of the spaces between the respective pairs of rollers 15.

As shown in FIG. 1, the electromagnetic clutch 50 includes an armature 51 axially facing the end surface of the tubular portion 27 of the control retainer member 16A, a rotor 52 axially facing the armature 51, and an electromagnet 53 axially facing the rotor 52.

As shown in FIG. 9, the armature 51 is fitted on the outer periphery of the support ring 30 so as to be rotatable and slidable relative to the support ring 30. The armature 51 has a coupling tube 55 at its outer peripheral portion in which the tubular portion 27 of the control retainer member 16A is press-fitted, so that the control retainer member 16A and the armature 51 are fixedly coupled together. Since these two members are fixedly coupled together, the armature 51 is slidably supported by two axially spaced apart surfaces, namely by the cylindrical radially outer surface 54 of the support ring 30 and by the slide guide surface 32, which is formed on the outer periphery of the input shaft $S_1$.

The support ring 30 is axially positioned by a shoulder 34 formed on the second axial side of the slide guide surface 32 of the input shaft $S_1$ which is opposite from the first end of the housing.

The rotor 52 is fitted on the input shaft $S_1$ so as to be rotationally fixed to the input shaft $S_1$, and axially positioned by a shim 56 mounted between the rotor 52 and the support ring 30.

As shown in FIG. 1, the electromagnet 53 comprises an electromagnetic coil 53*a*, and a core 53*b* supporting the electromagnetic coil 53*a*. The core 53*b* is fitted in the opening of the housing 1 at its second end and prevented from separating from the housing 1 by the snap ring 3, which is mounted in the opening of the housing at the second end. The core 53*b* is rotatably supported by the input shaft $S_1$ through a bearing 57 fitted on the input shaft $S_1$.

Figure 10:
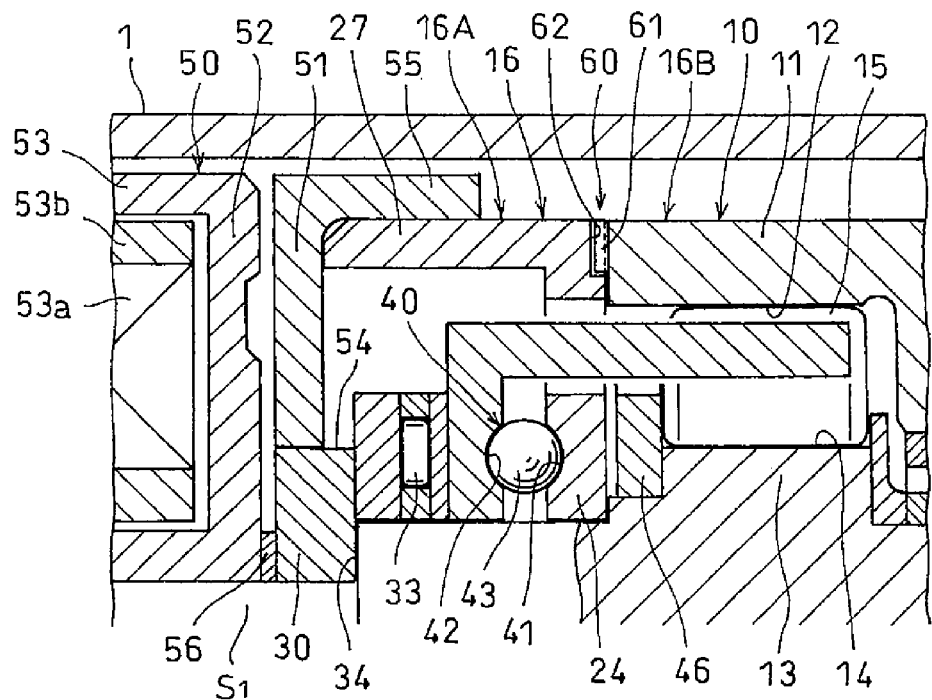
FIG. 10 is a sectional view showing how the control retainer member is released from the electromagnetic clutch shown in FIG. 1.

FIG. 10 shows the state in which the electromagnetic coil 53*a* of the electromagnetic clutch 50 is not energized. In this state, the first flange 24 of the control retainer member 16A is in abutment with the open end surface of the outer ring 11 of the two-way clutch 10. An anti-rotation arrangement 60 is provided between the outer ring 11 and the flange 24 of the control retainer member 16A. With the first annular flange 24 in abutment with the open end surface of the outer ring 11, the anti-rotation arrangement 60 is configured to prevent relative rotation between the outer ring 11 and the control retainer member 16A.

Figure 7:
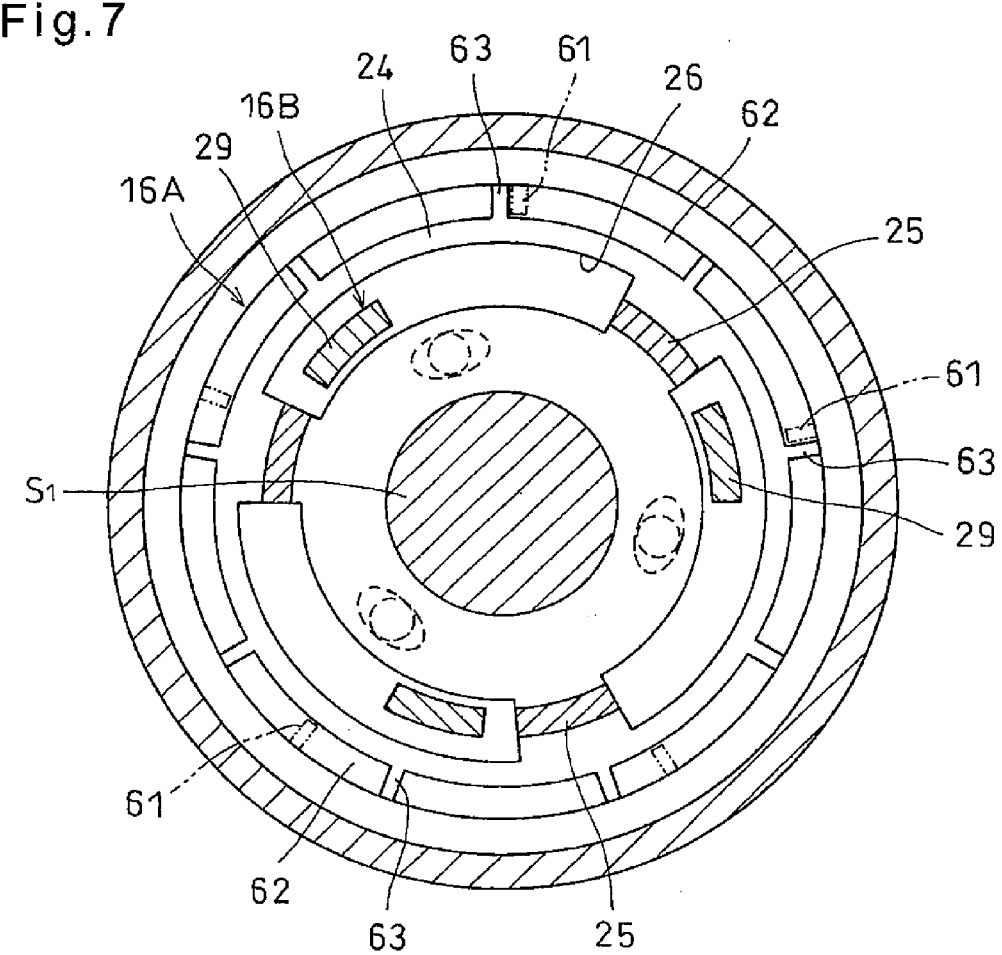
FIG. 7 is a sectional view taken along line VII-VII of FIG. 1.
Figure 8:
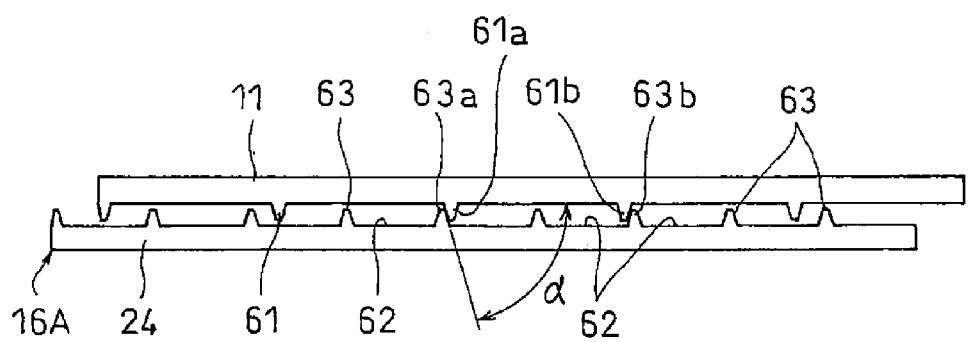
FIG. 8 is a developed view of an anti-rotation arrangement for preventing rotation of a control retainer member relative to an outer ring, the anti-rotation arrangement being provided on an open end surface of an outer ring and a flange of a control retainer member, shown in FIG. 1.

As shown in FIGS. 7 to 9, the anti-rotation arrangement 60 includes a plurality of circumferentially equidistantly spaced apart protrusions 61 formed on the open end surface of the outer ring 11, and a plurality of recesses 62 formed in the surface of the first flange 24 of the control retainer member 16A facing the outer ring 11. The recesses 62 are arranged in the circumferential direction and are equal in circumferential width to each other. The protrusions 61 and the recesses 62 are configured to prevent rotation of the control retainer member 16A relative to the outer ring 11 when the protrusions 61 engage some of the circumferential end surfaces of the recesses 62.

In the embodiment, there are five protrusions 61, and the five protrusions 61 are relatively small protrusions. On the other hand, there are nine of the recesses 62. That is, the recesses 62 are different in number from that of the protrusions 61. The recesses 62 are in the shape of a circular arc. Projections 63 substantially identical in size to the protrusions 61 are defined between the adjacent recesses 62.

In the embodiment, there are the five protrusions 61 and the nine recesses 62. When the control retainer member 16A is brought into abutment with the open end surface of the outer ring 11, as shown in FIG. 8, two of the projections 63, namely the projections 63*a* and 63*b*, engage one circumferential side surface of one (61*a*) of a circumferentially adjacent pair of the protrusions 61 and the opposite circumferential side surface of the other (61*b*) of the circumferentially adjacent pair of the protrusions 61, respectively. Thus, rotation of the control retainer member 16A relative to the outer ring 11 is prevented.

Alternatively, the recesses and the protrusions may be formed on the open end surface of the outer ring 11 and on the first flange 24 of the control retainer member 16A, respectively. Also, the protrusions 61 and the recesses 62 may be equal both in number and size to each other. Further alternatively, the recesses 62 may be equal in number to a multiple of the number of the protrusions 61.

FIG. 2(*b*) shows the state in which the rollers 15 of the two-way clutch 10 of the rotation transmission device embodying the present invention are in engagement. When the electromagnetic coil 53*a* of the electromagnetic clutch 50 is energized in this state, magnetic attraction force is applied to the armature 51, so that the armature 51 is moved axially until the armature 51 is pressed against the rotor 52.

Since the armature 51 is fixedly coupled to the control retainer member 16A, when the armature 51 is moved axially, the control retainer member 16A is moved in the axial direction in which the first flange 24 of the control retainer member 16A approaches the second flange 28 of the rotary retainer member 16B.

When the control retainer member is moved in this direction, the balls 43 move while rolling from the position shown in FIG. 6(*b*) to the position shown in FIG. 6(*a*), in which the balls 43 are at the deepest points of the respective cam grooves 41 and 42, thus causing the control retainer member 16A and the rotary retainer member 16B to be rotated relative to each other in the direction in which the circumferential widths of the pockets 31 decrease. Thus, each opposed pair of rollers 15, as shown in FIG. 2(*b*), are pushed by the bar 25 of the control retainer member 16A and the bar 29 of the rotary retainer member 16B, respectively, toward each other.

As a result, the rollers 15 move to the neutral position shown in FIG. 2(*a*), where the rollers 15 are disengaged from the cylindrical surface 12 and the cam surfaces 14. The two-way clutch 10 thus disengages.

When the control retainer member 16A is moved in the above axial direction, as shown in FIG. 9, the protrusions 61 disengage from the recesses 62, allowing the control retainer member 16A to rotate relative to the outer ring 11.

With the two-way clutch 10 disengaged, when torque is applied to the input shaft $S_1$ such that the inner ring 13 rotates in one direction, the anti-rotation pieces 47 formed on the retaining plate 46 push either the bars 25 of the control retainer member 16A or the bars 29 of the rotary retainer member 16B, thus rotating the control retainer member 16A and the rotary retainer member 16B together with the inner ring 13. At this time, since the opposed pairs of rollers 15 are in the disengaged neutral position, the rotation of the inner ring 13 is not transmitted to the outer ring 11, so that the inner ring 13 rotates freely.

When the control retainer member 16A and the rotary retainer member 16B rotate relative to each other in the direction in which the circumferential widths of the pockets 31 decrease, the bars 25 of the control retainer member 16A and the bars 29 of the rotary retainer member 16B abut the respective side edges of the anti-rotation pieces 47 of the retaining plate 46, preventing any further relative rotation between the retainer members 16A and 16B.

This in turn prevents the elastic members 21 from being compressed more than necessary, and thus prevents breakage of the elastic members 21 due to fatigue, even though the elastic members 21 are repeatedly compressed and expanded.

With the inner ring 13 rotating alone, when the electromagnetic coil 53*a* is de-energized, the attraction force applied to the armature 51 disappears, so that the armature 51 becomes rotatable. This in turn allows the control retainer member 16A and the rotary retainer member 16B to be rotated relative to each other in the direction in which the circumferential widths of the pockets 31 increase, under the biasing force of the elastic members 21, until the rollers 15 are moved to the stand-by position, where the rollers 15 can instantly engage the cylindrical surface 12 and the cam surfaces 14 (see FIG. 2(*b*)). In this state, torque is transmitted between the inner ring 13 and the outer ring 11 through one of each opposed pair of rollers 15.

If, in this state, the input shaft $S_1$ is stopped and then rotated in the opposite direction, the rotation of the inner ring 13 is transmitted to the outer ring 11 through the other of each opposed pair of rollers 15.

When the electromagnetic coil 53*a* is de-energized, since the control retainer member 16A and the rotary retainer member 16B are rotated relative to each other in the direction in which the circumferential widths of the pockets 31 increase such that the rollers 15 are moved to the stand-by position, where the opposed pairs of rollers 15 can instantly wedge into the cylindrical surface 12 and the respective cam surfaces 14, the rollers 15 scarcely move in the rotational direction when the clutch engages. It is thus possible to instantly transmit the rotation of the inner ring 13 to the outer ring 11.

Since the torque of the inner ring 13 is transmitted to the outer ring 11 through rollers 15 which are equal in number to the cam surfaces 14, it is possible to transmit large torque from the inner ring 13 to the outer ring 11.

When the control retainer member 16A and the rotary retainer member 16B rotate relative to each other in the direction in which the circumferential widths of the pockets 31 increase, the control retainer member 16A moves toward the open end surface of the outer ring 11, until, as shown in FIG. 8, the first flange 24 of the control retainer member 16A is brought into abutment with the open end surface of the outer ring 11, with protrusions 61 in engagement with corresponding recesses 62, thereby rotationally fixing the control retainer member 16A to the outer ring 11.

This prevents the control retainer member 16A from rotating relative to the outer ring 11 even under the influence of disturbance applied to the rotation transmission device, such as vibrations. As a result, the rollers 15 are kept in engagement with the cylindrical surface 12 and the cam surfaces 14, and will never move to the neutral position, so that torque can be reliably transmitted between the inner ring 13 and the outer ring 11 through the rollers.

When the control retainer member 16A and the rotary retainer member 16B rotate relative to each other in the direction in which the circumferential widths of the pockets 31 increase, the balls 43 roll toward the shallow portions of the respective opposed pairs of cam grooves 41 and 42 until the balls 43 reach the position shown in FIG. 6(*b*).

In the embodiment of FIG. 1, since the control retainer member 16A and the rotary retainer member 16B are mounted such that the bars 25 and 29 thereof are disposed between the outer ring 11 and the inner ring 13, while the flanges 24 and 28 thereof, which axially face each other, are disposed between the outer ring 11 and the armature 51, it is possible to use a short and lightweight outer ring 11.

In the anti-rotation arrangement 60 shown in FIG. 8, the protrusions 61, which are formed on the outer ring 11, have first engaging surfaces, while the circumferentially opposed end surfaces of the projections 63 defined between the adjacent pair of recesses 62, which are formed in the flange 24 of the control retainer member 16A, have second engaging surfaces which can be brought into engagement with the first engaging surfaces. If the inclination angles α of the first and second engaging surfaces with respect to the open end surface of the outer ring 11 are larger than the inclination angles of the cam grooves 41 and 42 of the torque cam 40, it could become impossible to disengage the two-way clutch 10.

Figure 12:
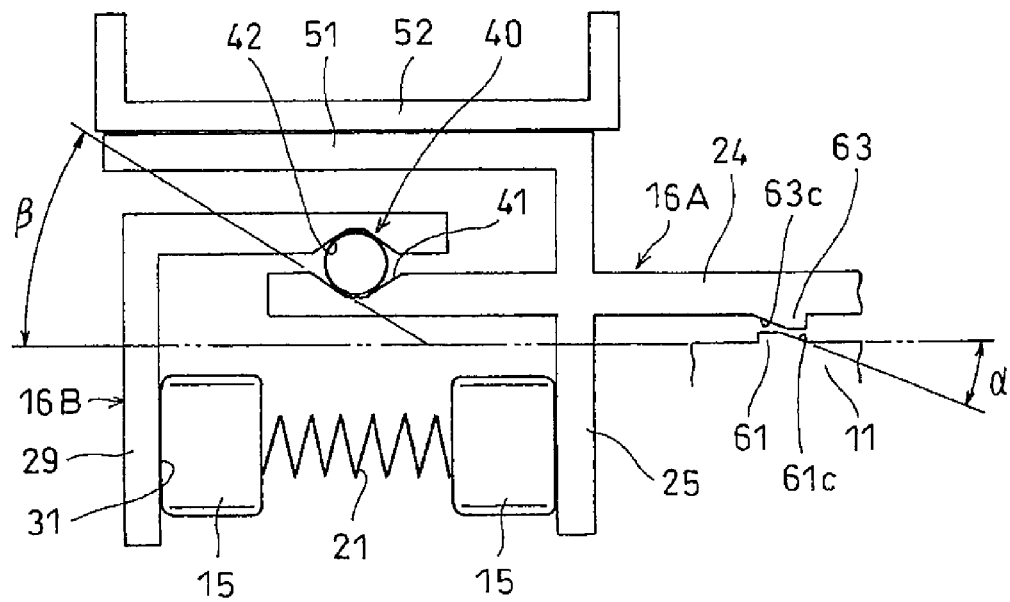
FIG. 12 schematically shows the state in which relative rotation is not prevented by the anti-rotation arrangement of FIG. 11.
Figure 13:
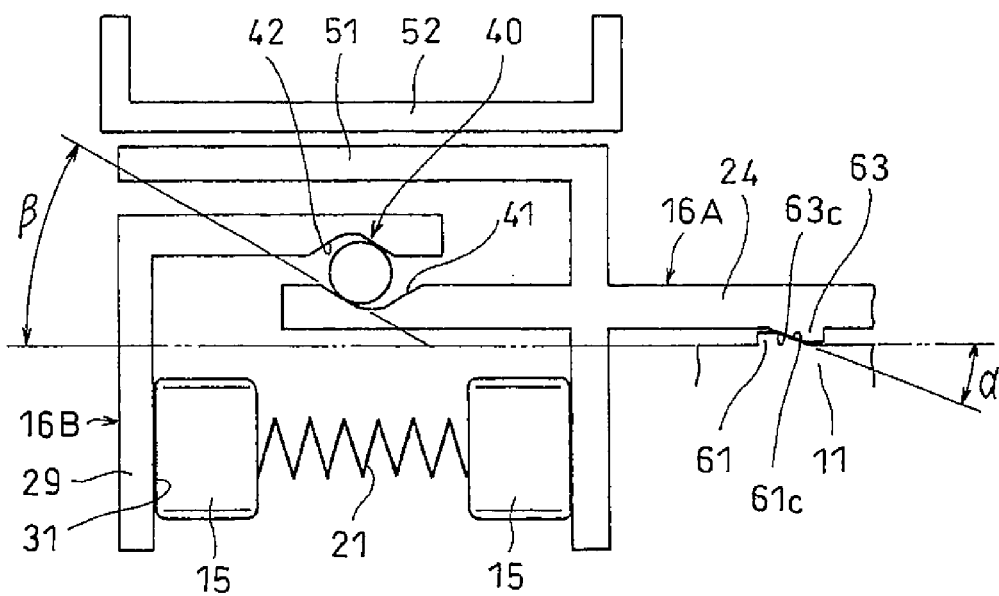
FIG. 13 schematically shows the state in which relative rotation is prevented by the anti-rotation arrangement of FIG. 11.

As schematically shown in FIGS. 12 and 13, when the electromagnetic coil 53*a* of the electromagnet 53 is energized while torque is being transmitted through the rollers 15 that are in contact with the bars 29 of the rotary retainer member 16B, since the rotary retainer member 16B is in engagement with the rollers 15 through which torque is being transmitted, and thus cannot rotate in the direction in which the circumferential widths of the pockets 31 decrease, the control retainer member 16A tends to rotate in the direction in which the circumferential widths of the pockets 31 decrease, while simultaneously moving toward the rotor 52, by the action of the torque cam 40.

However, if the inclination angles α of the above first and second engaging surfaces with respect to the open end surface of the outer ring are larger than the inclination angles β of the cam grooves 41 and 42 (α>β), the first and second engaging surfaces could interfere with the rotation of the control retainer member 16A, thereby making it impossible for the rollers 15 to disengage.

Figure 11:
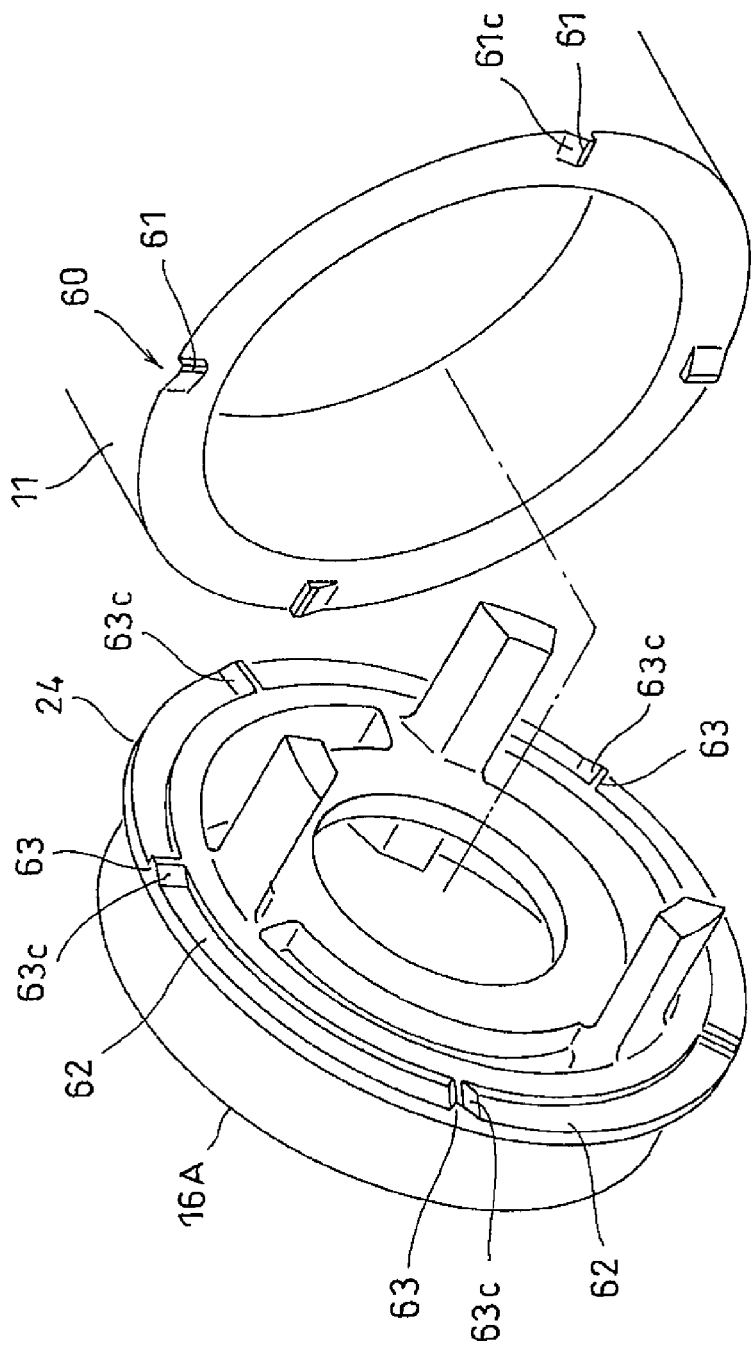
FIG. 11 is an exploded perspective view of a modification of the anti-rotation arrangement.

In FIGS. 11 to 13, tapered surfaces are formed on the trailing end surfaces 61*c* of the protrusions 61 with respect to the normal rotational direction of the outer ring, and on the end surfaces 63*c* of the projections 63 facing the respective trailing end surfaces 61*c* such that the inclination angles α of the tapered surfaces with respect to the open end surface of the outer ring are smaller than the inclination angles β of the cam grooves 41 and 41 with respect to the open end surface of the outer ring.

Since the inclination angles α of the above-described tapered surfaces are smaller than the inclination angles β of the cam grooves 41 and 42, the tapered surfaces will never interfere with the rotation of control retainer member 16A. Thus, when the electromagnetic coil 53*a* of the electromagnet 53 is energized in the state of FIG. 13, the control retainer member 16A rotates in the direction in which circumferential widths of the pockets 31 decreases, while moving in the axial direction, to the position shown in FIG. 12. Thus, the two-way clutch 10 can be reliably disengaged.

As used herein, the "normal" rotational direction of the outer ring refers to the clockwise rotational direction of the outer ring when the open end surface of the outer ring is viewed from the direction normal to the open end surface.

While torque is being transmitted through the rollers 15 that are in contact with the bars 25 of the control retainer member 16A, since the rollers 15 that are in contact with the bars 29 of the rotary retainer member 16B are not engaged, the rotary retainer member 16B is freely rotatable in the direction in which the circumferential widths of the pockets 31 decrease. Thus, even if the inclination angles α of the other end surfaces of the protrusions 61 and the projections 63 are larger than the inclination angles β, it is possible to rotate and simultaneously axially move the control retainer member 16A by energizing the electromagnetic coil 53*a* of the electromagnet 53. Therefore, as shown in FIGS. 11 to 13, the other end surfaces of the protrusions 61 and the projections 63 may extend perpendicular to the open end surface of the outer ring.

When the electromagnetic coil 53*a* of the electromagnet 53 is de-energized, the protrusions 61 of the anti-rotation arrangement 60 may be quickly returned under the biasing force of the elastic members 21, and thus may collide hard against the projections 63. Therefore, if the protrusions 61 and/or the projections 63 are insufficient in strength, they may be damaged. In the embodiment, the portions of the outer ring 11 and the control retainer member 16A that face each other are subjected to heat treatment to increase their strength.

Figure 14:
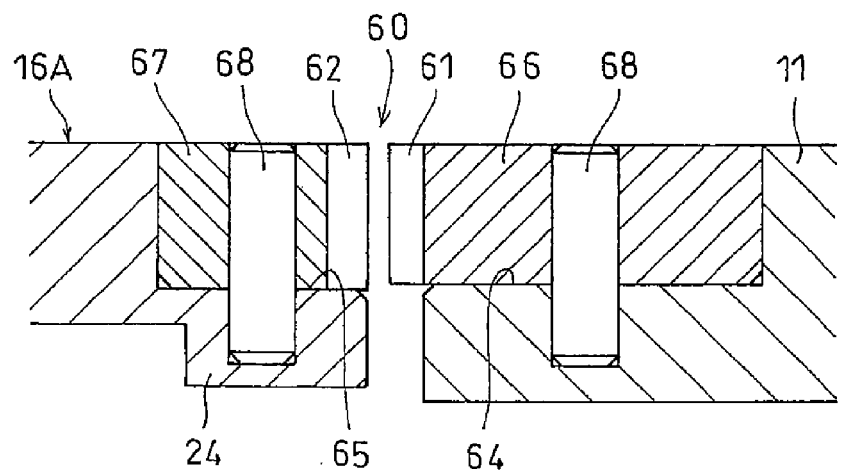
FIG. 14 is a sectional view of a modification in which protrusions and recesses of the anti-rotation arrangement are formed on rings.

In the embodiment of FIGS. 7 to 9, the protrusions 61 and the recesses 62 of the anti-rotation arrangement 60 are formed directly on the open end surface of the outer ring 11 and the first flange 24 of the control retainer member 16A. In the embodiment of FIG. 14, rings 66 and 67 are respectively fitted on small-diameter cylindrical surfaces 64 and 65 formed on the radially outer portion of the open end surface of the outer ring 11, and on the radially outer portion of the first flange 24 of the control retainer member 16A, and fixed to the outer ring 11 and the control retainer member 16A by pins 68. The protrusions 61 and the recesses 62 are formed on one and the other of the opposed surfaces of the rings 66 and 67, respectively.

In the above embodiments, the anti-rotation arrangement 60 comprises surface engagement elements in the form of the protrusions 61 and the recesses 62. However, the surface engagement elements of the anti-rotation arrangement 60 according to the present invention are not limited thereto. For example, FIGS. 15 to 17 show different surface engagement elements of the anti-rotation arrangement 60.

Figure 15:
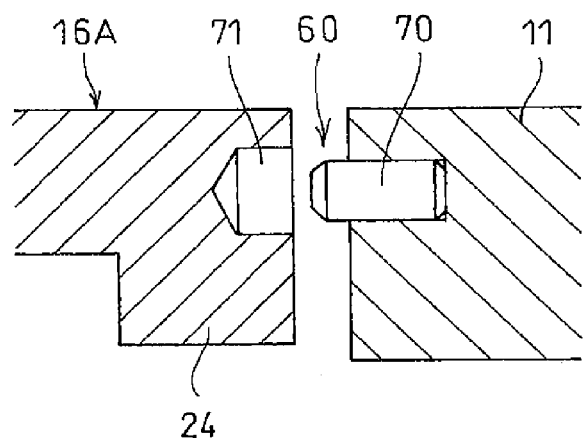
FIG. 15 is a sectional view of still another modification of the anti-rotation arrangement.

The anti-rotation arrangement 60 shown in FIG. 15 includes a plurality of pins 70 fixed to the outer ring 11 so as to protrude from the open end surface of the outer ring 11, and pin holes 71 formed in the first flange 24 of the control retainer member 16A so as to face the respective pins 70, and is configured to prevent rotation of the control retainer member 16A relative to the outer ring 11 when the pins 70 are engaged in the pin holes 71.

In FIG. 15, the pins 70 and the pin holes 71 are equal in number to each other, but the pins 70 and the pin holes 71 may be different in number from each other. For example, the number of the pin holes 71 may be a multiple of the number of the pins 70. Also, the pins 70 may be fixed to the first flange 24 so as to protrude from the flange 24, and the pin holes 71 may be formed in the outer ring 11.

Figure 16:
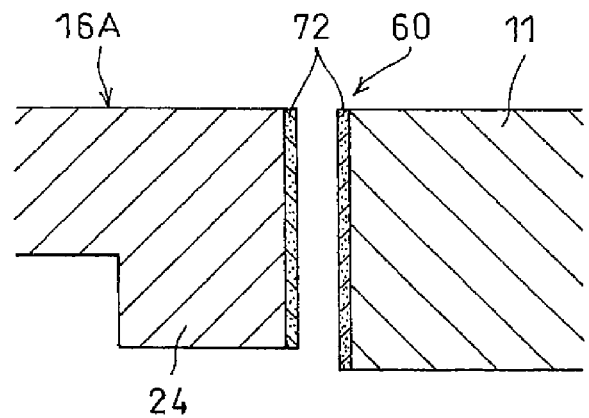
FIG. 16 is a sectional view of yet another modification of the anti-rotation arrangement.
Figure 17:
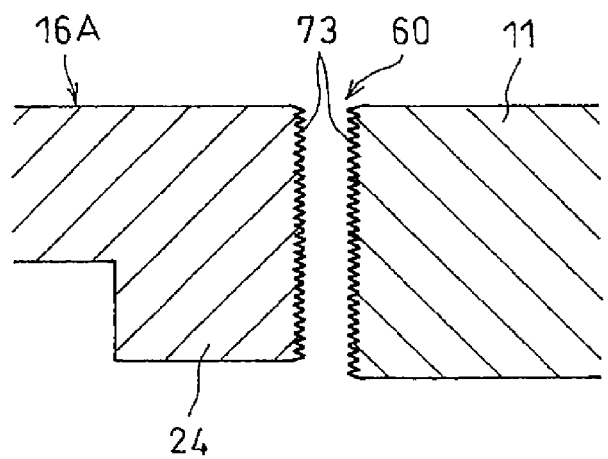
FIG. 17 is a sectional view of a further different modification of the anti-rotation arrangement.

The anti-rotation arrangement 60 shown in FIG. 16 includes friction members 72 of high friction coefficient fixed, respectively, to the open end surface of the outer ring 11 and the side surface of the first flange 24 of the control retainer member 16A facing the outer ring 11, and is configured to prevent rotation of the control retainer member 16A relative to the outer ring 11 when the friction members 72 come into surface contact with each other.

The anti-rotation arrangement 60 shown in FIG. 17 is in the form of rough surfaces 73 of high friction coefficient formed, respectively, on the open end surface of the outer ring 11 and the side surface of the first flange 24 of the control retainer member 16A facing the outer ring 11, and is configured to prevent rotation of the control retainer member 16A relative to the outer ring 11 when the rough surfaces 73 are brought into frictional engagement with each other.

Figure 18:
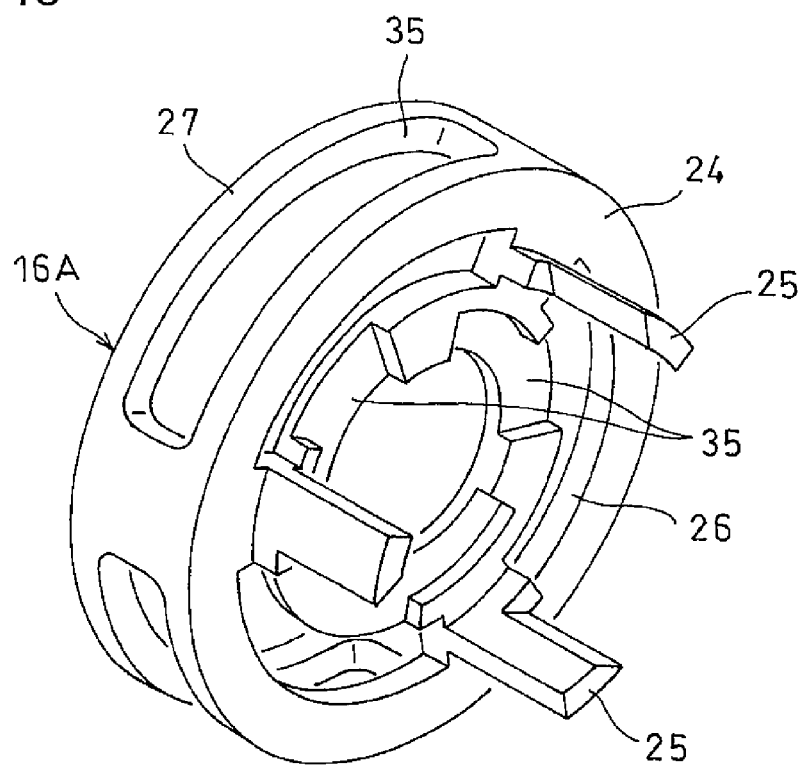
FIG. 18 is a perspective view of a modified control retainer member.

FIG. 18 shows a different control retainer member 16A. The first flange 24 of this retainer member 16A is formed with weight reducing recesses 35 in the side surface of the flange 24 facing the outer ring 11, while the tubular portion 27 of the retainer member 16A is formed with circumferentially elongated weight reducing holes 35.

The weight reducing recesses and holes 35 reduce the weight of the control retainer member 16A, thus making it possible to use an electromagnetic clutch 50 that is small in size and capacity.

The two-way clutch 10 of the embodiment of FIGS. 1 to 3 is a roller type clutch configured such when the electromagnet 53 is energized, the control retainer member 16A is moved in the axial direction. Simultaneously, the control retainer member 16A and the rotary retainer member 16B are rotated relatively to each other. This causes adjacent pairs of rollers 15 as the engaging elements to move closer to each other, and disengage from the inner periphery 12 of the outer ring 11 and the outer periphery of the inner ring 13. However, the two-way clutch according to the present invention is not limited to this particular type.

Figure 19:
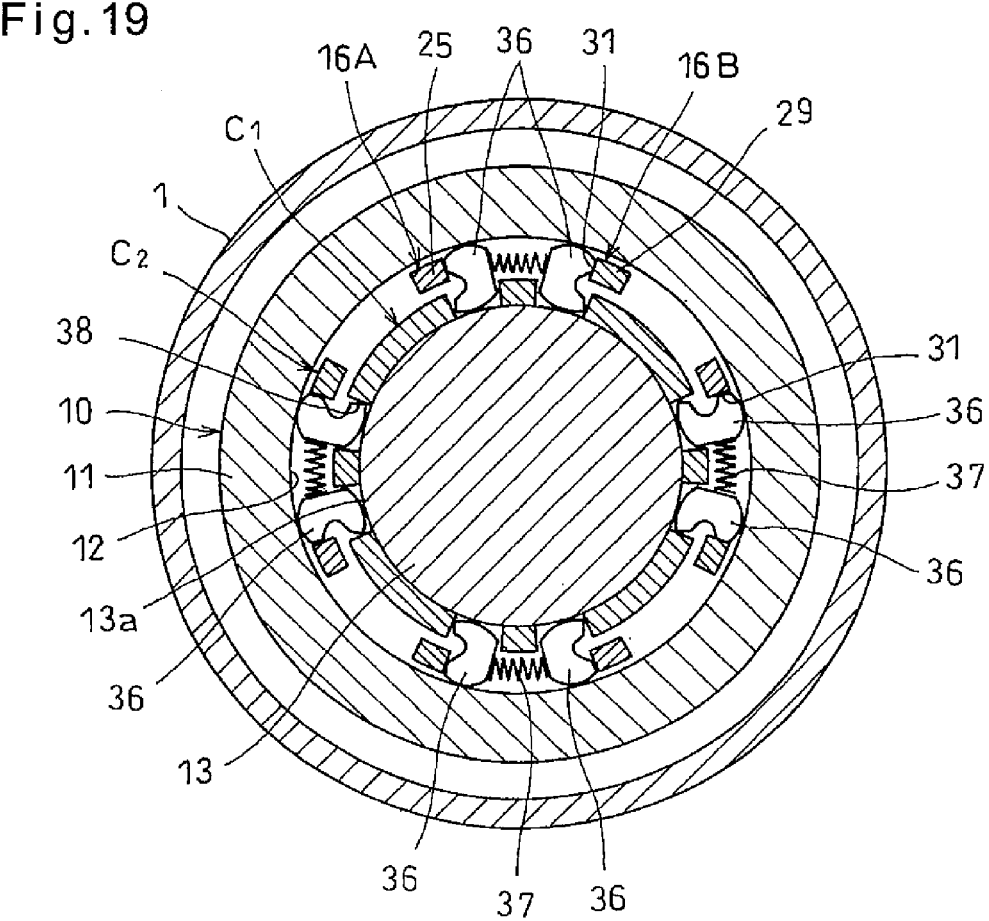
FIG. 19 is a sectional view of a modified two-way clutch.

For example, as shown in FIG. 19, the two-way clutch 10 may be a sprag type clutch including two retainers $C_1$ and $C_2$ which are different in diameter from each other, with the large-diameter retainer $C_2$ comprising the control retainer member 16A and the rotary retainer member 16B as used in the embodiment of FIGS. 1 to 3. A pair of sprags 36 and an elastic member 37 are mounted in each of the pockets 31 defined between the bars 25 of the control retainer member 16A and the bars 29 of the rotary retainer member 16B, with the elastic member 37 disposed between the pair of sprags 36 and with the inner end portions of the sprags 36 inserted in respective pockets 38 formed in the small-diameter retainer $C_1$ such that the sprags 36 are pivotable about their respective inner end portions.

In this sprag type two-way clutch 10, when the electromagnet 53 of the electromagnetic clutch 50 is de-energized, each pair of sprags 36 are pivoted by the elastic member 37 such that their outer ends move away from each other until the sprags 36 engages a cylindrical inner surface 12 of the outer ring 11 and a cylindrical outer surface 13a of the inner ring 13. When the electromagnet 53 is energized, the control retainer member 16A is moved in the axial direction. Simultaneously, the control retainer member 16A and the rotary retainer member 16B rotate relative to each other in the direction in which the outer ends of each pair of sprags 36 are pushed by the bars 25 and 29 of the respective retainer members toward each other, until the sprags 36 disengage from the cylindrical inner surface 12 of the outer ring 11 and the cylindrical outer surface 13a of the inner ring 13.

In the torque cam shown in FIG. 6, every time the electromagnetic coil 53a of the electromagnetic clutch 50 is energized or de-energized, the balls 43 are configured to roll along the respective pairs of cam grooves 41 and 42, thus causing the control retainer member 16A and the rotary retainer member 16B to rotate relative to each other. While the retainer members are being rotated relative to each other, the biasing force of the elastic members 21 is being continuously applied to the balls 43. This may cause wear or deformation of the surfaces of the cam grooves 41 and 42, if the surface hardness of the cam grooves 41 and 42 is not sufficiently high.

Deformation of the surfaces of the cam grooves 41 and 42 could interfere with smooth relative rotation between the control retainer member 16A and the rotary retainer member 16B, thus impairing accurate operation of the two-way clutch 10. Thus, for accurate operation of the two-way clutch 10, the control retainer member 16A and the rotary retainer member 16B have to be sufficiently durable.

Heat treatment is typically used to improve durability of an object. But if the entire control retainer member 16A and the entire rotary retainer member 16B were subjected to heat treatment, such heat treatment would reduce their toughness to such an extent that when the rollers 15 are pushed by the retainer members to their neutral position, cracks tend to develop at the roots of the bars 25 and 29 due to stress concentration.

Figure 20:
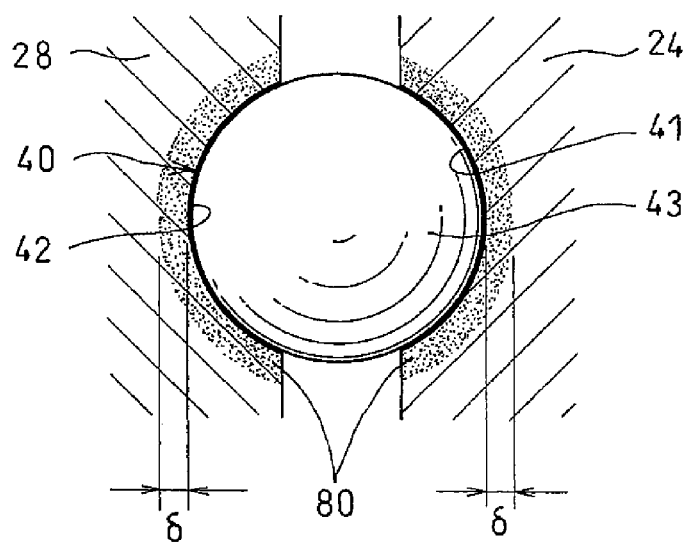
FIG. 20 is a sectional view of a modified torque cam.

In the embodiment shown in FIG. 20, the surfaces of the cam grooves 41 and 42 are subjected to heat treatment to form hardened surface layers 80 on the cam grooves 41 and 42. If the depths δ of the hardened surface layers are too large, the hardened layers could influence, and reduce the strength of, the roots of the bars 25 and 29. Heat treatment of the cam grooves 41 and 42 is therefore performed to form the hardened layers to depths δ within the range of 0.3 to 0.8 mm.

By only locally subjecting the retainer members to heat treatment, namely, by subjecting only the surfaces of the cam grooves 41 and 42 to heat treatment, it is possible to harden only the surface layers of the cam grooves 41 and 42, while ensuring high toughness at the roots of the bars 25 and 29. This prevents wear and deformation of the surfaces of the cam grooves 41 and 42, as well as damage to the roots of the bars 25 and 29, thus improving durability of the control retainer member 16A and the rotary retainer member 16B.

Such heat treatment may be induction hardening or laser hardening. In such hardening treatment is used, the control retainer member 16A and the rotary retainer member 16B are made of carbon steel. Such carbon steel may e.g. be S35C, S45C, SCM, SUJ2.

As shown in FIG. 5, the respective pairs of cam grooves 41 and 42, as well as the balls 43, of the torque cam 40 are preferably arranged circumferentially offset from the bars 25 and 29 of the control retainer member 16A and the rotary retainer member 16B, in order to minimize the influence of the heat treatment on the bars 25 and 29.

The rotation transmission device according to the present invention is configured such that the electromagnetic clutch 50 selectively engages and disengages the two-way clutch 10, thereby selectively transmitting rotation between the input shaft S1 and the output shaft $S_2$. As shown in FIG. 1, the opening of the housing 1 at the second end thereof is closed by the electromagnet 53. The electromagnet 53 thus prevents entry of foreign matter into the housing 1 through the opening at the second end. However, if the outer end of the bearing tube 2, which is provided at the first end of the housing 1, is left open, foreign matter may enter the housing 1 through this opening, and could get stuck in the two-way clutch 10, making the two-way clutch 10 inoperative.

Figure 21:
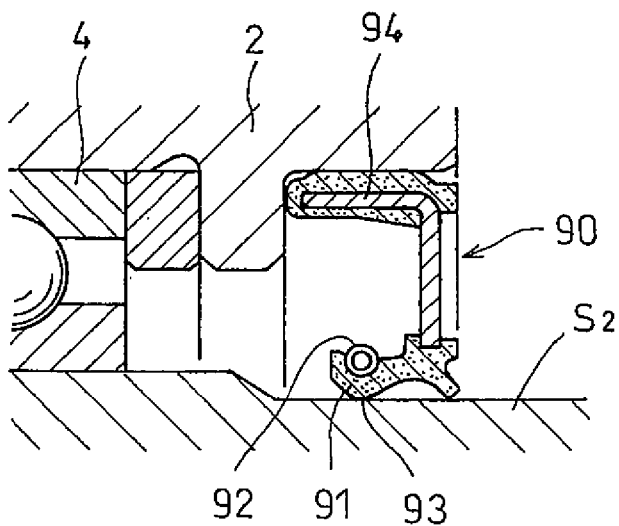
FIG. 21(a) is a sectional view showing how a bearing tube of a housing is sealed by a seal.
FIG. 21(b) is a sectional view showing a modification of the seal of FIG. 21(a).
Figure 21:
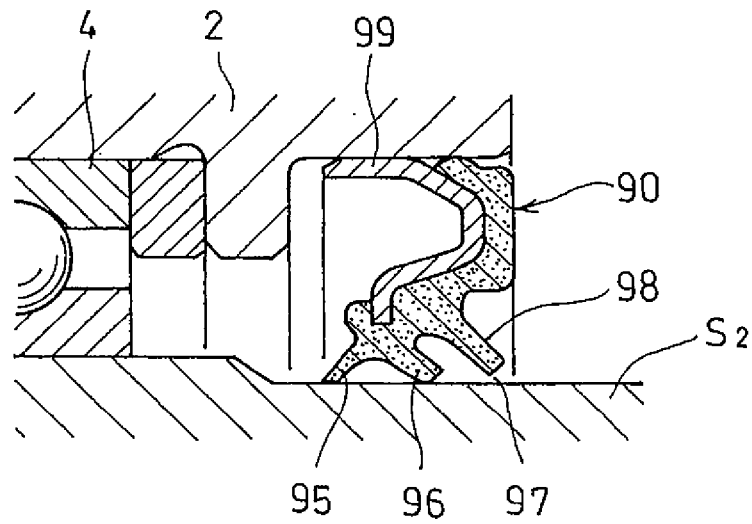

To avoid this problem, in FIG. 21, a seal 90 is press-fitted into the radially inner surface of the bearing tube 2 at its open end portion, while holding the housing 1 in position, to seal between the radially inner surface of the bearing tube 2 and the radially outer surface of the output shaft $S_2$.

By mounting the seal 90 in the bearing tube 2, the seal 90 closes the open end of the bearing tube 2, thereby preventing entry of foreign matter into the housing 1. Since the seal 90 is press-fitted into the radially inner surface of the bearing tube 2, while holding the housing 1 in position, the axial load from the seal 90 when press-fitting the seal 90 is supported by the housing 1, and is never transmitted to the bearing 19, which supports the output shaft $S_2$ and the input shaft $S_1$ so as to be rotatable relative to each other. This prevents damage to the bearing 19 when mounting the seal 90.

Since this arrangement prevents entry of foreign matter into the housing 1, it is possible to use open type bearings or non-contact type bearings, which are both inexpensive, as the bearing 4, which rotatably supports the output shaft $S_2$, and the bearing 19, which supports the output shaft $S_2$ and the input shaft $S_1$ so as to be rotatable relative to each other.

The seal 90 shown in FIG. 21(a) is an oil seal including a seal lip 91 which can be brought into elastic contact with the radially outer surface of the output shaft $S_2$, and a garter spring 92 fitted around the seal lip 91 and elastically pressing the tip 93 of the seal lip 91 against the radially outer surface of the output shaft $S_2$. The seal 90 further includes a reinforcing metal ring 94.

The seal 90 shown in FIG. 21(b) is a triple-lip oil seal including an inwardly extending lip 95 and an outwardly extending lip 96 which are both in elastic contact with the radially outer surface of the output shaft $S_2$, and a third lip 98 provided outwardly of the outwardly extending lip 96 and defining a labyrinth 97 between the lip 98 and the radially outer surface of the output shaft $S_2$. This seal 90 also further includes a reinforcing metal ring 99.

Either of the above seals 90 can effectively prevent entry of foreign matter into the housing 1. Either of the above seals 90 will never damage the bearing 19 when press-fitted into the housing 1 because it is press-fitted into the radially inner surface of the bearing tube 2.

DESCRIPTION OF THE NUMERALS

S1. Input shaft
S2. Output shaft
11. Outer ring
12. Cylindrical surface
13. Inner ring
14. Cam surface
15. Roller (engaging element)
16A. Control retainer member
16B. Rotary retainer member
21. Elastic member
24, 28. Flange
25, 29. Bar
31. Pocket
35. Weight reducing recess or hole
36. Sprag (engaging element)
37. Elastic member
40. Torque cam (motion converter means)
50. Electromagnetic clutch
53. Electromagnet
60. Anti-rotation arrangement
61. Protrusion
62. Recess
66, 67. Ring
70. Pin
71. Pin hole
72. Friction member
73. Rough surface
90. Seal
91. Seal lip
92. Garter spring
93. Tip of the lip
95. Inwardly extending lip
96. Outwardly extending lip
97. Labyrinth
98. Third lip

What is claimed is:
1. A rotation transmission device comprising:
an input shaft extending in an axial direction,
an output shaft arranged coaxial with the input shaft,
a two-way clutch configured to selectively transmit torque between the input shaft and the output shaft, and
an electromagnetic clutch configured to selectively engage and disengage the two-way clutch,
wherein the two-way clutch includes:
an outer ring at an end of the output shaft and having an end surface at an opening of the outer ring;
an inner ring at an end of the input shaft;

a control retainer including a first annular flange and first bars on a surface of the first annular flange at an outer peripheral portion of the first annular flange;

a rotary retainer including a second annular flange and second bars on a surface of the second annular flange at an outer peripheral portion of the second annular flange, the first bars and second bars being disposed between an inner periphery of the outer ring and an outer periphery of the inner ring and arranged such that the first bars circumferentially alternate with respective second bars such that pockets are defined between each pair of adjacent first bars and second bars, the first annular flange facing the end surface of the outer ring in the axial direction, and the second annular flange being disposed between the first annular flange and the electromagnetic clutch in the axial direction;

a plurality of pairs of engaging elements, each pair of the engaging elements being mounted in one of the pockets so as to be engageable with the inner periphery of the outer ring and the outer periphery of the inner ring; and elastic members mounted in the respective pockets and configured to bias the respective pairs of engaging elements away from each other, wherein the electromagnetic clutch comprises an armature coupled to the control retainer, a rotor facing the armature in the axial direction, and an electromagnet facing the rotor in the axial direction and configured to attract the armature against the rotor, thereby moving the control retainer in the axial direction toward the rotor, upon energization of the electromagnet, wherein the two-way clutch further comprises a motion converter mechanism comprising a torque cam configured to convert the axial movement of the control retainer toward the rotor to relative rotation between the control retainer and the rotary retainer in a direction in which circumferential widths of the pockets decrease so as to allow the engaging elements to disengage from the inner periphery of the outer ring, and wherein the rotation transmission device further comprises an anti-rotation arrangement including surface engagement elements disposed directly between the end surface of the outer ring and the first annular flange of the control retainer and configured to prevent relative rotation between the outer ring and the control retainer while the electromagnet is de-energized and the two-way clutch is engaged.

2. The rotation transmission device of claim 1, wherein the anti-rotation arrangement comprises protrusions formed on one of the end surface of the outer ring and an opposed surface of the first annular flange facing the end surface of the outer ring, and recesses formed in the other of the end surface and the opposed surface, wherein each of the recesses has two circumferentially opposed end surfaces, and wherein the protrusions and the recesses are configured such that when the protrusions are received in at least one of the recesses, at least two of the protrusions can engage two of the end surfaces of the recesses, thereby preventing relative rotation between the outer ring and the control retainer.

3. The rotation transmission device of claim 2, wherein the recesses are circumferentially elongated, circular arc-shaped recesses, and wherein a quantity of the recesses is larger than a quantity of the protrusions.

4. The rotation transmission device of claim 2, wherein the protrusions are directly formed on one of the end surface of the outer ring and the first annular flange of the control retainer, and wherein recesses are directly formed in the other of the end surface of the outer ring and the first annular flange of the control retainer.

5. The rotation transmission device of claim 2, wherein the protrusions are formed on one of two rings fixedly fitted on the end surface of the outer ring and the first annular flange of the control retainer, respectively, and wherein the recesses are formed in the other of the two rings.

6. The rotation transmission device of claim 2, wherein the torque cam includes opposed pairs of cam grooves formed in respective opposed surfaces of the first annular flange of the control retainer and the second annular flange of the rotary retainer, wherein each of the cam grooves is deepest at a circumferential center of the cam groove, and a depth of the cam groove gradually decreases toward respective circumferential ends of the cam groove, and balls mounted between the respective opposed pairs of cam grooves, whereby the torque cam is configured to rotate the control retainer and the rotary retainer relative to each other in the direction in which the circumferential widths of the pockets decrease when the control retainer is moved in the axial direction toward the rotor, wherein each of the protrusions of the anti-rotation arrangement has a leading end surface and a trailing end surface with respect to a normal rotational direction of the outer ring, wherein the trailing end surface and one of the two end surfaces of each of the recesses for facing the trailing end surface are tapered surfaces, and wherein inclination angles of the respective tapered surfaces with respect to the end surface of the outer ring are smaller than inclination angles of the respective cam grooves with respect to the end surface of the outer ring.

7. The rotation transmission device of claim 6, wherein each of the respective cam grooves has a hardened surface layer higher in hardness than an internal portion of the respective cam groove, and wherein the hardened surface layer is formed by subjecting only surfaces of the cam grooves to heat treatment.

8. The rotation transmission device of claim 7, wherein a depth of the hardened surface layer of each of the cam grooves is within a range of 0.3 mm to 0.8 mm.

9. The rotation transmission device of claim 1, wherein the anti-rotation arrangement comprises a pin on one of the end surface of the outer ring and an opposed surface of the first annular flange facing the end surface, and a pin hole formed in the other of the end surface and the opposed surface such that the pin is engageable in the pin hole.

10. The rotation transmission device of claim 1, wherein the anti-rotation arrangement comprises friction members fixed to the end surface of the outer ring and a surface of the first annular flange facing the end surface, respectively.

11. The rotation transmission device of claim 1, wherein the anti-rotation arrangement comprises rough surfaces formed on the end surface of the outer ring and a surface of the first annular flange facing the end surface, respectively.

12. The rotation transmission device of claim 1, wherein the control retainer has a weight reducing hole or recess in at least one of a radially outer surface and a side surface of the control retainer.

13. The rotation transmission device of claim 1, wherein the control retainer and the rotary retainer are arranged such that only the first bars of the control retainer and the second bars of the rotary retainer are disposed between the inner ring and the outer ring, with the first annular flange of the control retainer facing the end surface of the outer ring in the axial direction.

14. The rotation transmission device of claim 1, further comprising a housing covering the two-way clutch and the electromagnetic clutch, and including a bearing tube through which the output shaft is inserted, and a seal press-fitted in a radially inner surface of the bearing tube and sealing between the radially inner surface of the bearing tube and a radially outer surface of the output shaft.

15. The rotation transmission device of claim 14, wherein the seal comprises an oil seal including a seal lip to be brought into elastic contact with the radially outer surface of the output shaft, and a garter spring fitted on an outer periphery of the seal lip to keep a distal end of the seal lip in elastic contact with the radially outer surface of the output shaft.

16. The rotation transmission device of claim 14, wherein the seal comprises an oil seal including an inwardly extending lip and an outwardly extending lip in elastic contact with the radially outer surface of the output shaft, and a third lip arranged outwardly of the outwardly extending lip and defining a labyrinth between the third lip and the radially outer surface of the output shaft.

17. The rotation transmission device of claim 1, wherein the control retainer has a one-piece construction.

\* \* \* \* \*